United States Patent Office 3,071,767
Patented Jan. 1, 1963

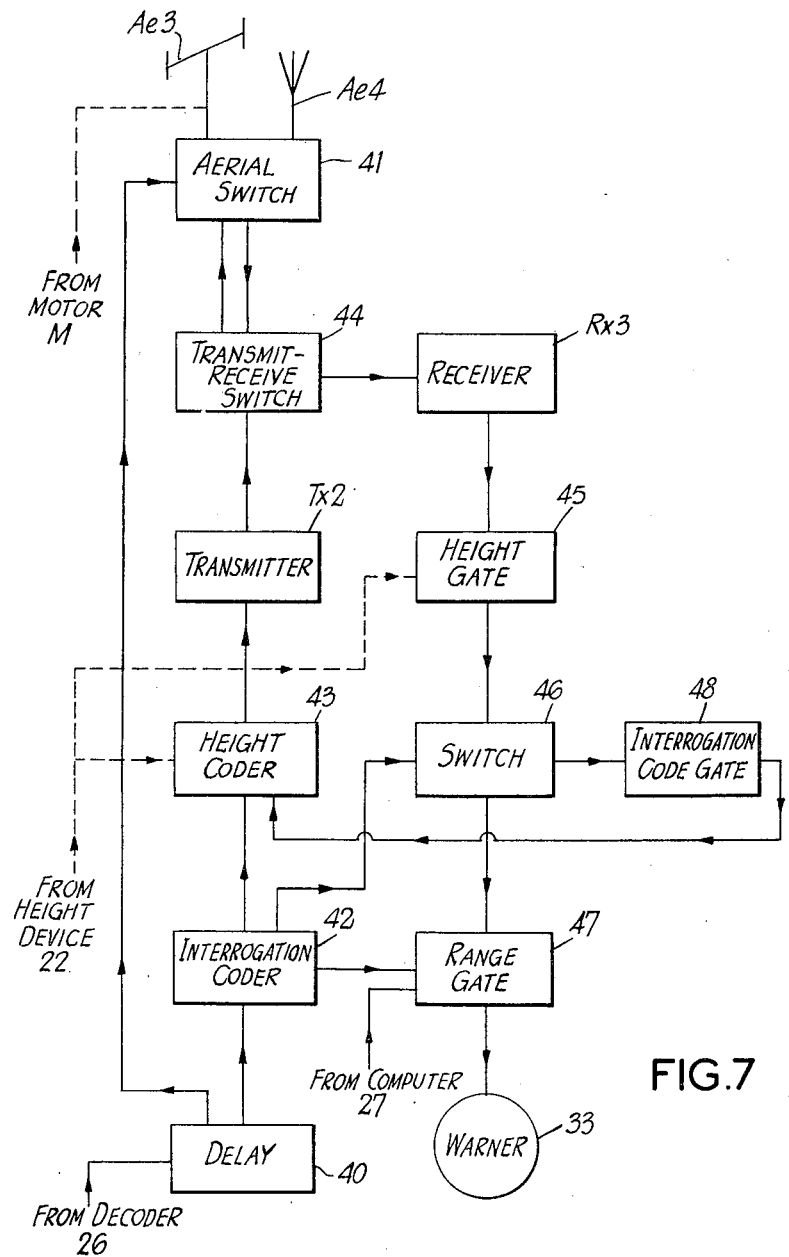

3,071,767
APPARATUS FOR THE AVOIDANCE
OF COLLISION
Harold Philip Freedman, Twickenham, England, assignor to Avel Corporation Geneva, Geneva, Switzerland, a body corporate of Switzerland
Filed Nov. 23, 1959, Ser. No. 854,746
Claims priority, application Great Britain Nov. 28, 1958
10 Claims. (Cl. 343—112)

This invention concerns a method and apparatus for the avoidance of collisions between moving vessels.

The invention is equally applicable to ships and aircraft but in the case of aircraft it will be understood that they cannot collide unless they are at the same height and consequently it will be assumed hereinafter that, in the case of aircraft, it has been ascertained that they are at the same height and that a collision is therefore possible.

In the avoidance of collision three main steps are necessary and the first of these steps is for one of the vessels to ascertain the precise course, speed and bearing of the other vessel. This may in theory be carried out by observation, radar or the like but such an arrangement has inherent inaccuracies which are too great to make the arrangement practical for high speed aircraft. It is more satisfactory for the vessels to exchange or transmit from one vessel to the other the details of course and speed and by means of suitable directional apparatus to determine the bearing of the transmissions. Accordingly the present invention is applicable to an arrangement in which there is a mutual exchange of data at least insofar as one of the vessels is informed by the other vessel of the course and speed of this other vessel. The next step is to operate upon this data to determine whether or not a collision is likely. The other and final step is that once it has been decided that the two vessels are upon collision courses an avoidance manoeuvre is necessary and rules can readily be laid down as to the most satisfactory avoidance manoeuvre.

In the co-pending application Serial No. 690,377, filed October 15, 1957, now Patent No. 2,980,908, there was disclosed apparatus for the mutual exchange of data between vessels in the avoidance of collisions and this exchange took place by means of radio signals coded with the course and speed of the vessels and the relative bearing was determined by means of a suitable direction finding apparatus such as a radio compass. It was suggested that the received data should then be decoded and, together with the comparable data regarding one's own vessel and the mutual bearing as determined by the radio compass, should be fed to a computer to decide whether vessels would arrive at the intersection of their courses at the same time. This arrangement, whilst satisfactory in theory, has the disadvantage that direction finding means and more specifically a radio compass is relatively slow to operate and a relatively long time must be allowed before it can be safely assumed that the radio compass has accurately homed upon the incoming transmission and, therefore, a relatively long time must be allowed to elapse before signals can safely be passed to the computer apparatus. Unfortunately, and especially in the case of fast moving aircraft, only a very short time is available for carrying out the whole process if sufficient time is to be allowed for the avoidance manoeuvre and therefor it appears necessary to reduce the overall time.

Furthermore, if direction finding apparatus similar to a radio compass is used, the form in which the codings may be impressed upon the radio transmission must be such as not to interfere with the proper operation of the radio compass. These requirements result in the fact that if there are a very large number of vessels in a given vicinity it may be difficult to carry out the computation on all the vessels in the short time which can be allowed before a collision risk becomes an actual collision.

It is an object, therefore of the present invention to provide a method of and apparatus for the avoidance of collisions.

According to the present invention there is provided a method for the avoidance of collisions between two moving vessels comprising, in a first vessel, receiving data regarding the course and speed of a second vessel and determining similar data regarding the course and speed of the first vessel and passing such data to a computer in the first vessel to compute the bearing on which the second vessel must lie in order to be on a collision course.

According to a further aspect of the present invention there is provided apparatus for the avoidance of collisions between moving vessels comprising, in a first vessel, means to determine the course and speed of the first vessel; means to receive a transmission from the second vessel giving data regarding the course and speed of the second vessel; a computer; means to feed to said computer the data received from the second vessel and the data determined in the first vessel and to compute the bearing on which the second vessel must lie to be on a collision course with the first vessel; and an output from such computer representing such bearing.

Very desirably directional means are set by the output of the computer so that it is determined from a subsequent transmission whether the other vessel is in point of fact on or near the bearing of danger.

The term "subsequent" merely implies that the transmission is later in time than the data exchange; it may form part of the data exchange transmission or be a separate transmission.

The term directional means as used herein should be understood as meaning firstly a direction finding receiving means either of the null or narrow lobe acceptor type and designed to operate upon a subsequent transmission from the second vessel or alternatively a directional transmitting means designed to facilitate the transmission of a signal to the second vessel to be returned by that vessel either as a reflection, e.g. radar or as a response from a transponder to be detected in the first vessel. Consequently the term "transmission" must include also a reflection. Normally such direction sensitive means will be or include a radio or radar antenna. However, alternatively it may be sufficient merely to send to the second vessel an intimation that it is on the bearing of danger and to follow this by a transmission of, for example, the full data regarding the first vessel so as to enable the second vessel to take the avoiding action.

It will now be understood that the present invention differs radically from the arrangement proposed in the said prior application in that the computer operates upon the known courses and speeds of the two vessels and directs direction sensitive means to search in a specific direction which is the bearing on which an intruding vessel must lie, on the basis of these courses and speeds, if it is likely to be involved in a collision. This may appear to be a minor re-arrangement of the apparatus of the said prior application but in point of fact the concept is different for it has hitherto been the practice to observe an intruding vessel and then to consider from its movement or from other information derived about its course and speed as to whether this vessel constitutes a danger. The philosophy of the present invention is to discover the course and speed of an intruding vessel and then to look and see if it is in a very small sector where it would be dangerous. Since the computing times can be kept relatively short in either arrangement and the time is taken in the previous arrangement in waiting for the radio compass to home on to a transmission, it will be understood that one advantage of the present invention is that only a short examination of the bearing of danger is necessary purely to determine whether the other vessel is there or not. Furthermore, it will be understood that it is an easy and rapid thing to point direction sensitive means into a specific direction rather than to provide direction finding means with apparatus causing it to home on to a transmission.

In order that the invention may more readily be understood the same will now be described with reference to the accompanying drawings in which:

FIGURE 7 shows a modified block diagram.

Figure 1:
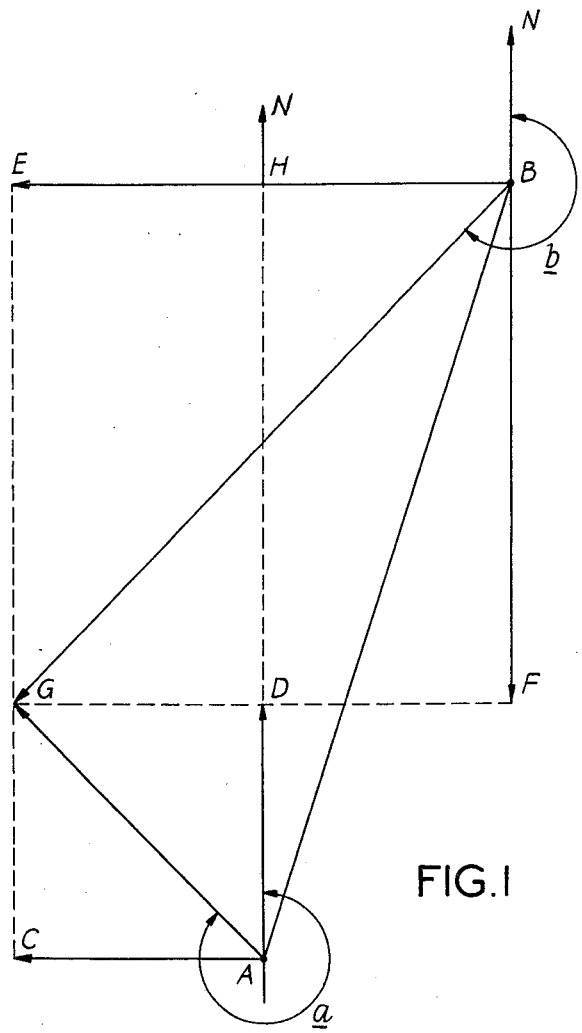
FIGURE 1 shows the vector triangle for the two vessels.

Referring now to FIGURE 1, the points A and B represent two vessels upon collision courses. A line AG is a vectorial representation of the course and speed of the vessel A, the vessel A actually moving on a course at an angle $a$ relative to north which is indicated by the line AN. The vector line AG may be resolved into two components at right angles, namely AD and AC, these being equal to $V_a \cos a$ and $V_a \sin a$. Likewise a line BG represents the vectorial velocity of the vessel B which is travelling on a course at an angle $b$ to north and this line may be resolved into the components BL and BF which are equal to $V_b \sin b$ and $V_b \cos b$.

The line AD is projected to cut the line BE at H.

The angle representing the bearing of danger from A to B (hereinafter called angle $x$) has a tangent equal to $HB/AH$. From FIGURE 1 it is obvious that $$\tan x = (FG-AC)/(AD+FB)$$

If these lines are considered as directive then $$\tan x = (V_a \sin a - V_b \sin b)/(V_a \cos a - V_b \cos b)$$

Figure 2:
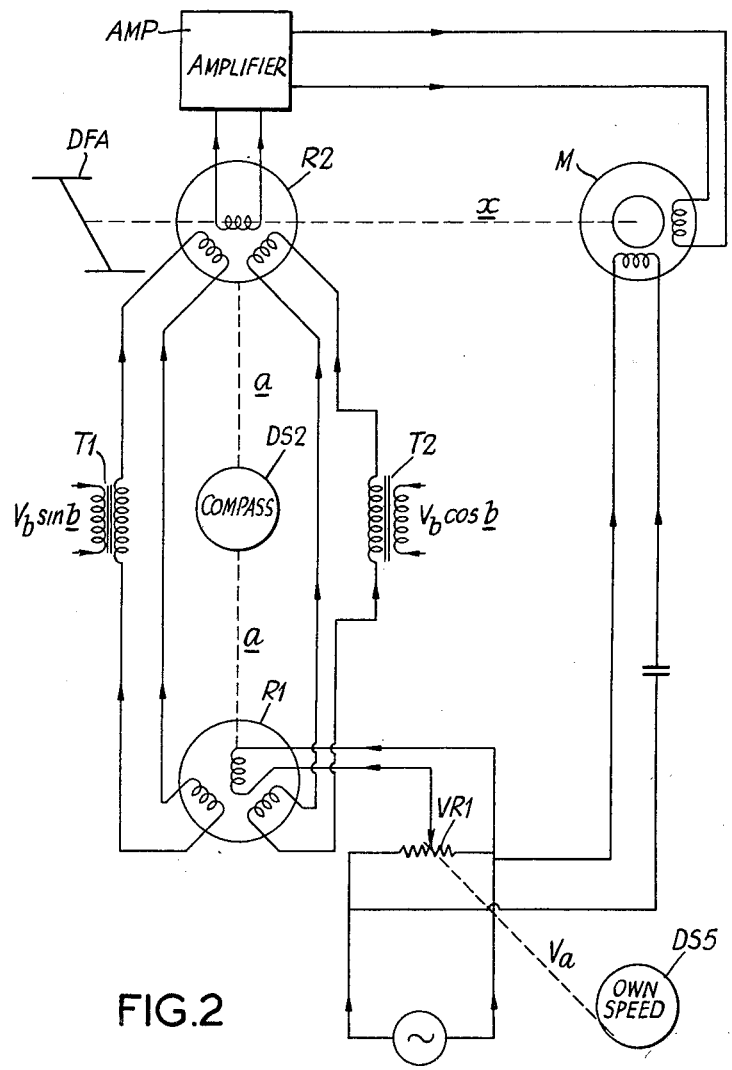
FIGURE 2 shows a computer.

It is preferred to use a form of computer specially designed to compute the bearing of danger and such a form of computer is shown in FIGURE 2 of the accompanying drawings.

Referring now to FIGURE 2, the output from an A.C. generator is fed to a potential divider or variable transformer indicated as a potentiometer VR1 which has its slider controlled by the speed indicator in one's own vessel and indicated in FIGURE 2 as a device DS5. The output from the potentiometer VR1 is proportional to speed and feeds the rotor of a resolver R1, this rotor being mechanically turned by a compass repeater DS2. Thus the outputs from the resolver R1 are $V_a \sin a$ and $V_a \cos a$.

The decoded outputs from the data exchange apparatus are transformed into comparable A.C. voltages and are fed, in the form $V_b \sin b$ and $V_b \cos b$, to transformers T1 and T2 so as to be subtracted from the outputs from the resolver R1. These difference voltages are fed to the two stator windings of a resolver R2 and the output from the rotor winding of this resolver R2 is fed to an amplifier AMP driving a servo motor M which turns the rotor of the resolver R2 through a mechanical connection into the stable null position corresponding to $x+90°$. The servo motor M also drives a direction sensitive device indicated as an antenna DFA. The compass DS2 also drives the stator of the resolver R2 so that a constant spacial direction is maintained for the direction finding device.

It will be understood that this computer may operate using data transmitted in the form described in the said prior application, but it is preferred to exchange the data in the manner described in the co-pending application Serial No. 804,672 as the data exchange described in that application provides the data directly in the form needed in the computer of FIGURE 2.

When using the arrangement of the present invention it is preferred to transmit some or all of the data in the form of a pulse separation coding which may be generated in any suitable way making use of any form of delay, such as delay lines, electronic delay devices, or magnetic delay devices, and the decoders may each consist of bi-stable trigger circuit controlling a constant current device for charging a capacitor, e.g. a saw-tooth generator. The voltage stored in a capacitor charged in this way will be proportional to the time between pulses and may be fed to a cathode follower circuit driving a linear magnetic amplifier to give an A.C. output voltage proportional to the time between pulses. This enables relatively short pulses to be employed for the pulses themselves are not necessary to drive any part of the apparatus and the use of such a short pulse technique has certain advantages in reducing congestion and allowing a greater number of vessels to be in mutual communication.

The direction sensitive device controlled by the apparatus of FIGURE 2 may be a transmitting or receiving antenna, for example for a range measuring transponder or the like, a goniometer or an aerial commutating switch. Alternatively the device may be an indirectly operating goniometer, e.g. a photocell moved around the face of a cathode ray tube. The device may even be a device operated by visible or invisible light in which either the transmitter and/or receiver may be directional. Where the rotating device controlled by the computer is a radio aerial array, any frequency may be used for which a sufficiently directional array may be provided as it is not necessary to maintain strict phase relationships in the receiver fed by the aerial as is necessary in the case of radio compass devices which are, in practice, restricted to operation upon certain frequencies.

In a very convenient system adapted for the use of aircraft, each aircraft is fitted with a transmitter of several kilowatts peak power radiating from an omni-directional aerial which may be situated, for example, at the tip of the dorsal fin. The transmitted signal is in the form of short pulses making use of a pulse position coding. Thus, in a convenient arrangement, 10 pulses (each of one microsecond length) are transmitted every second, giving a duty cycle of 1:100,000. The coding is such that the first 8 pulses of the 10 pulse code occur within a period of half a millisecond, the remaining two pulses occurring some 500 milliseconds later. This pulse coding is used to convey all the necessary information.

Figure 3:
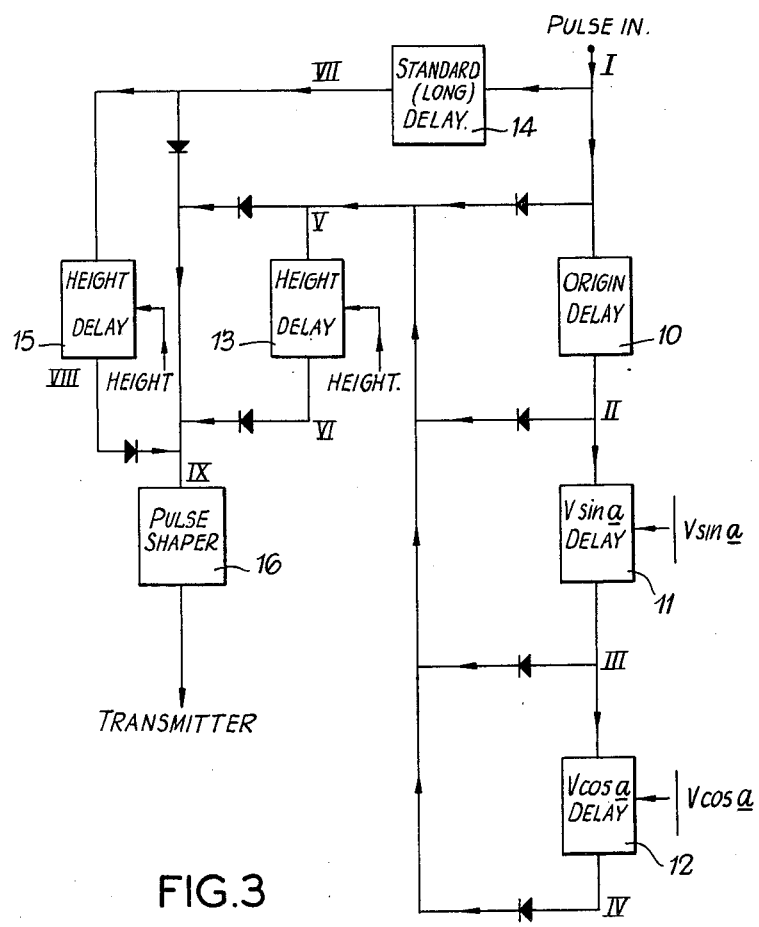
FIGURE 3 is a block diagram illustrating an encoder.
Figure 4:
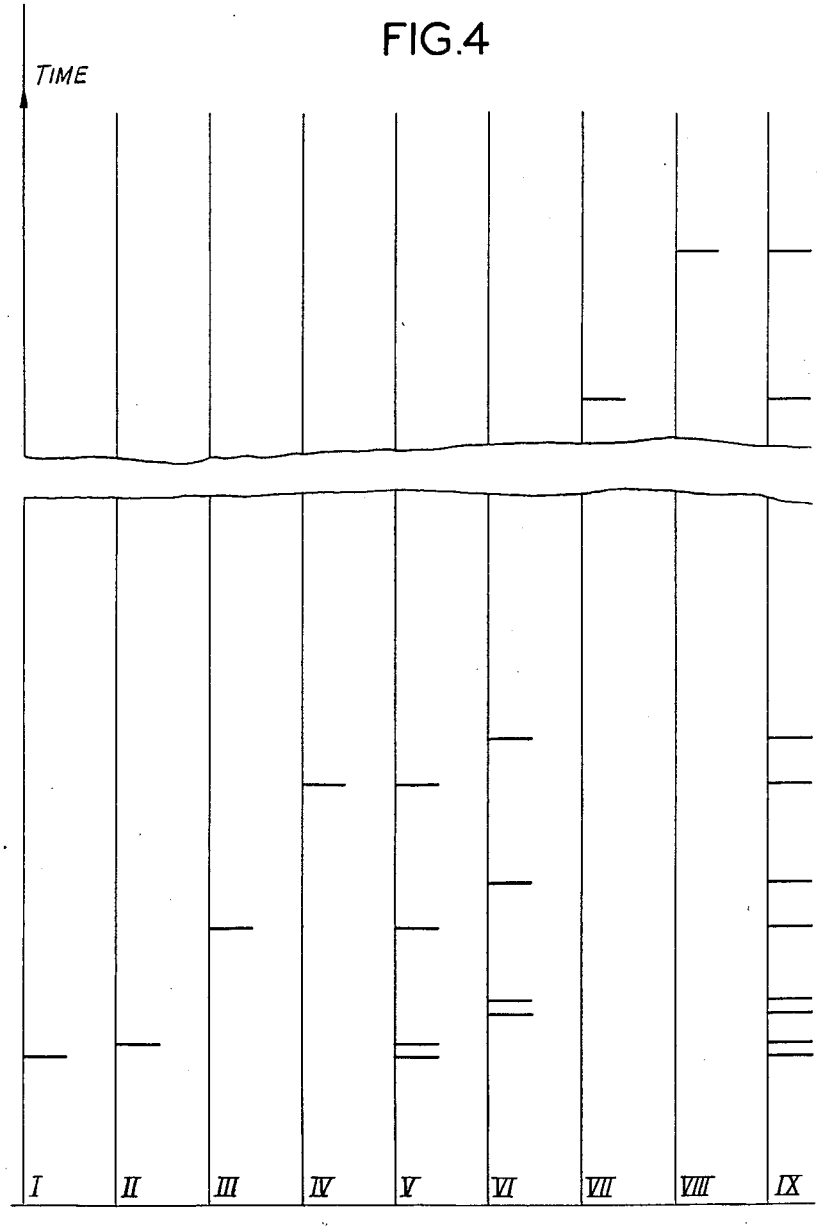
FIGURE 4 is a diagram illustrating the pulses appearing in the encoder of FIGURE 3.

FIGURE 3 depicts in block diagrammatic form the apparatus for generating the pulse train and FIGURE 4 illustrates the train itself, the Roman numerals identifying the lines in FIGURE 4 reappearing in FIGURE 3 at the points where the portions of the code depicted by the lines in FIGURE 4 appear. As shown in FIGURE 3, an input pulse is applied to a line I and passes to a delay circuit 10 to provide a short origin delay so that a slightly delayed pulse appears on line II. This origin pulse and the slightly delayed pulse form the first two pulses in the 10 pulse code and the pair of pulses together act as an origin signal.

The pulse appearing on line II is fed to a delay device 11 controlled by an input corresponding to $V \sin a$ to produce a pulse appearing on line III at a time position characteristic of $V \sin a$. The pulse appearing on line III is passed to a further delay device 12 so as to be delayed by a time corresponding to $V \cos a$ relative to the pulse on line III and this pulse appears on line IV. The pulses from lines I, II, III and IV are collected on line V.

In order that the receiver circuits will accept only pulses originating from aircraft at a similar height, the set of four pulses appearing on line V is delayed by an amount proportional to a form of height coding. The form of height coding actually employed in this embodiment is that disclosed in our co-pending application Serial No. 804,763, now Patent No. 3,049,706, but both digits are transmitted in each direction. The first digit of the height code is transmitted by delaying the train of four pulses appearing on line V by a specific amount in a delay circuit 13 set in accordance with the first digit of the height code. Thus a train of four pulses appears on line VI.

The second digit of the height code is transmitted by a pair of pulses, the first of these pulses being transmitted as a ninth pulse delayed by half a second as regards the pulse appearing on line I. This ninth pulse is derived from a standard delay circuit 14 and appears on the line VII. The pulse appearing on line VII is passed to a second height delay circuit 15 to provide a pulse on a line VIII delayed with respect to the pulse on line VII by an amount characteristic of the second part of the height code. The pulses appearing on lines V, VI, VII and VIII are collected on line IX as a complete train of 10 pulses which are passed to a pulse shaper 16 and thence to a transmitter.

Figure 5:
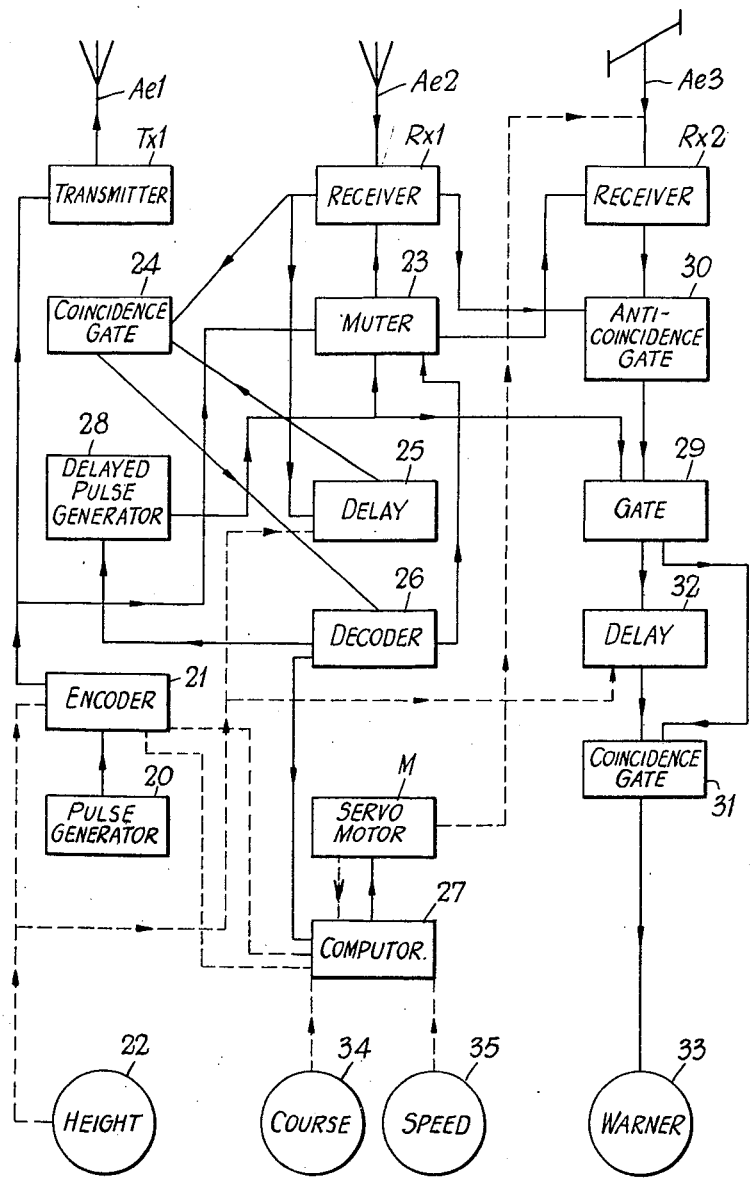
FIGURE 5 is a block circuit diagram of apparatus embodying the invention.

Now referring to the block diagram of the apparatus as illustrated in FIGURE 5, it will be seen that setting inputs are shown as dotted lines originating from circles which depict instruments in the aircraft. The apparatus of FIGURE 3 is depicted as a pulse generator 20 and an encoder 21 fed from a height sensitive unit 22, and course and speed sensitive units 34, 35. The pulses from the encoder 21 pass to a transmitter Tx1 and also to a muter 23, the pulses being radiated from the transmitter Tx1 on a suitable omni-directional aerial Ae1 as described and the muter 23 muting two receivers Rx1 and Rx2 whilst transmissions are taking place. The receiver Rx1 is provided with an aerial Ae2 which may be the same as the aerial Ae1 and is in any event omni-directional.

This receiver Rx1 receives signals from the remote aircraft and passes them to a coincidence gate 24 directly and also via a delay 25, such delay 25 being set by the first item of the height code. Thus, for every pair of pulses which are received by the receiver Rx1 and which are separated by a time equal to the code time for the value of the first item of the height coding of the receiving aircraft, a single pulse emerges from the coincidence gate 24. Thus the output from the coincidence gate 24 is equivalent to the pulses appearing on line VI in FIGURES 3 and 4. The pulses from the coincidence gate 24 are passed to a decoder 26 to separate out the origin signal and decode the information regard $V \sin b$ and $V \cos b$, passing such information to a computer 27 which is similar to that illustrated in FIGURE 2. The circuit of the decoder 26 is similar to that previously described and includes bi-stable switches together with the necessary pulse identification and re-setting circuits.

The computer 27, in conjunction with the servo motor M, sets a directional receiving antenna Ae3 to a null position for the bearing of danger, such aerial being moved in the period between the eighth and ninth pulses. The decoder 26 also sends a signal to the muter 23 to switch off the receivers Rx1 and Rx2.

The first origin pulse is passed from the decoder 26 to a delayed pulse generator 28 which generates a pulse to open a gate 29 and also switch on the receivers Rx1 and Rx2 via the muter 23 when the ninth and tenth pulses are expected.

If these ninth and tenth pulses originate from the bearing of danger, they will not be received by the receiver Rx2 but will be received by the receiver Rx1 and the outputs from these two receivers are passed to an anti-coincidence gate 30 which therefore emits a pulse if the remote aircraft is on the bearing of danger, such pulse from the anti-coincidence gate 30 being passed to the gate 29 which has been opened by the generator 28 for the short time necessary. Thus it is ensured that pulses passing through the gate 29 are those which originate from a remote aircraft for which the flight data has been received and which is on the bearing of danger.

The pulses from the gate 29 are passed to a coincidence gate 31 directly and also via a delay circuit 32 which is set in accordance with the second item in the height code and therefore an output will appear from the coincidence gate 31, if, and only if, the second digit of the height code of the remote aircraft corresponds to or is very close to the second item of the height code of the home aircraft, such signals emitted by the coincidence gate 31 activating a warning device 33.

It will be appreciated that the warning device 33 is activated only if the two aircraft are at approximately the same height and if the remote aircraft is on the bearing of danger. By use of the techniques disclosed in our said co-pending application Serial No. 804,763 the height selectivity may be modified to include adjacent height bands.

If the repetition rate of the pulses from the pulse generator 20 of FIGURE 5 is made standard for all aircraft, it will be known that the second transmission from a remote aircraft will occur a specific time after the first transmission. If, by the computation carried out on the first transmission, it is decided that the remote aircraft is either at a different height or not on the bearing of danger, then this standard interval between transmission will permit the adding of a circuit to cause the apparatus to ignore the subsequent transmissions from such remote aircraft.

It will be understood that by adding a further transmitter the system may be modified to allow the use of a second frequency for this transmitter and for the receiver Rx2 and this second frequency may, for example, be medium frequency, thus permitting the use of a loop aerial. A directional or omni-directional responding device may be added to allow for the measurement of range.

Figure 6:
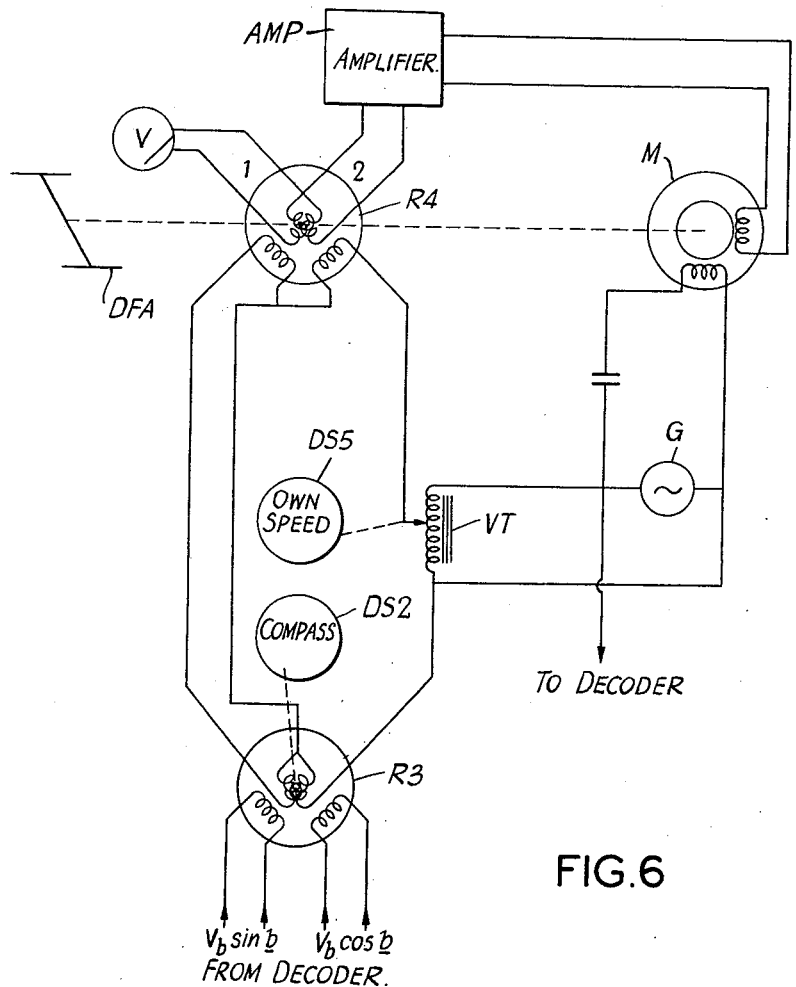
FIGURE 6 shows a modified computer.

An alternative form of computer is shown in FIGURE 6 and in this computer slight modifications are made as compared with the computer illustrated in FIGURE 2 but the general principle of operation is the same. Signals corresponding to $V_b \sin b$ and $V_b \cos b$ are fed to the two stator windings of a resolver R3 and this resolver has two rotor windings set at 90° and the rotor itself is set by the compass repeater DS2 so that the outputs from the rotor windings are $-V_b \sin (b-a)$, and $$-V_b \cos (b-a)$$

that is to say, proportional to the speed of the second vessel along and normal to the course of the first vessel. The air speed repeater DS5 controls a variable transformer VT to introduce into the leads a voltage corresponding to $V_a$ and the rotor windings of the resolver R3 are connected to the stator windings of resolver R4 which again has crossed rotor windings. Thus the resultant voltages fed to the resolver R4 represent the components of the relative velocity between the craft. It will be understood that the output from winding 2 of the rotor of the resolver R4 will be substantially zero when the rotor lies with its winding at right angles to the direction of the net field, i.e. at the bearing of danger, and the output from this winding is fed to an amplifier AMP which drives a two-phase servo motor M coupled to the rotor of the resolver R4 and to direction sensitive means DFA. The motor will, therefore, drive the rotor of the resolver R4 into the null position and by choice of a suitable value of gain in the amplifier the second null is rendered astable. The output from the winding 1 of the rotor of the resolver R4 is taken to a voltmeter V and will be a maximum at the bearing of danger, serving to show the relative closing speeds of the two vessels. All the inputs to the computer are fed from a generator G to ensure that they are of the correct phase, frequency and relative magnitude.

Although this computer is simpler than the computer of FIGURE 2 it does not provide voltages proportional to $V_a \sin a$ and $V_a \cos a$ which are useful.

It will be understood that the various resolvers of FIGURES 2 and 6 may be fed directly or through amplifiers and, if they are fed through amplifiers, the resolvers may include additional feedback windings to improve linearity.

It is inevitable that in any system of the type in question errors must arise and some of these errors will be fixed but others will be variable. However, in any specific instance of data exchange, it will be possible to compute the maximum errors that may be inherent in the exchange and to provide for the addition of safety factor so as to compute a specific angle which is centred on the bearing of danger and which defines a region of space within which the other vessel must not lie for safety. However, it is not easy to make allowances for these errors in the computer and it is, therefore, preferred to make allowances in the actual direction sensitive means. In the preferred embodiment described, the direction sensitive means are in the form of a highly directional null type antenna system, and, for the sake of example, such null type antenna systems may comprise a loop aerial which is rotatable and a fixed rod aerial together giving a cardioid polar diagram; the rod type aerial may of course be the same as the omni-directional aerial or may be a separate element depending upon convenience. It will be apparent that in this arrangement the omni-directional antenna provides a signal related to the field strength in the area and the signal from the directional antenna will be related to the same field strength. The polar diagram of the omni-directional antenna is a circle and the origin of the circle and cardioid are coincident whilst the bearing of danger lies upon the axis of the cardioid. It will be understood that the two polar diagrams intersect at two points which are symmetrical about the line indicating the bearing of danger and the effective angle between these two points may be used to define the spread in the bearing of danger angle.

Theoretically this angle may be varied by increasing the diameter of the circle relatively to the cardioid until, in the maximum, an acceptance angle of 360° is reached. The effective diameter of the circle can be correlated with the errors in order to provide an adjustment of the angle of acceptance of the system. This is relatively simply effected by using the output from the omni-directional receiver R$x$1 to control an amplitude gate when, if the signal from the directional receiver R$x$1 is less than the signal from the omni-directional receiver R$x$2, it will be known that the other vessel lies within the angle of acceptance of the device, this angle being set by adjusting the relative strengths of the signals fed from the two receivers to the amplitude gate. Such adjustment may be made automatically to compensate for the likely errors for the particular bearing of danger.

By introducing a non-linearity into the circuit of one of the receivers, a variation in the relative magnitudes of the outputs from the directional and omni-directional receivers may be produced so as to be dependent upon signal strength, so that the effective acceptance angle may be caused to increase with decreasing range so that the minimum "miss-distance" may be kept more nearly constant.

Various expedients are clearly possible and those which may be mentioned include the use of a fixed acceptance angle known to be greater than the maximum errors likely to be incurred in the system, such acceptance angle being chosen simply by the choice of a directional antenna with a suitable polar diagram. Alternatively, if directional antennae can be provided having very pronounced and narrow rejection angles, a plurality of such directional antennae may be provided and the appropriate one may be selected by means of a commutating switch. It is clear that taking into account the errors of the system it is merely necessary for the commutating switch either to switch in two or more antennae to provide an effective broadening of the null angle or alternatively to switch in to antennae corresponding to the outside limits of the acceptance angle and to derive from the two signals as to whether the intruding vessel is between them and therefore in the acceptance angle.

In the preferred embodiment as described, use is made of an anti-coincidence gate for determining whether or not the intruding vessel lies on the bearing of danger and this gate is combined with a null-type, directional antenna, but which will be clear that a conventional directional acceptor antenna can be provided but it will then be necessary to link this to a coincidence gate in place of the anti-coincidence gate.

The choice of antenna types under these circumstances depends to a very large extent to the frequency involved but at suitable frequencies very highly directional antenna may be provided, for example of the type that has a polar diagram somewhat in the form of a very elongated ellipse with the location of the antenna substantially at one end of the ellipse and almost upon its periphery.

FIGURE 7 illustrates a portion of the apparatus of FIGURE 5 but modified so as to allow for range determination. Referring now to FIGURE 7, the entire exchange of data as described with reference to FIGURE 5 takes place so that eight pulses are received, are decoded and are operated on by the computer 27 so as to control the motor M. This motor M, as before, drives an antenna A$e$3 which is a directional antenna used for both transmitting and receiving.

At the end of the eighth pulse, the decoder 26 of FIGURE 5 emits a pulse which is passed to a delay device 40 to provide a standard delay which is estimated to be long enough to enable the antenna A$e$3 to be turned into the correct position. This delay device 40 then emits a pulse which is fed to a changeover aerial relay device 41 to connect the antenna A$e$3 into circuit. The pulse is also passed to an interrogation coder 42 to generate a double pulse characteristic of an interrogation. This double pulse is then passed to a height coder 43 which is controlled by the height device 22 so as to generate two pulse pairs at a separation characteristic of the second part of the height coding which, it will be remembered, is not included in the eight pulses previously described. The output from the height coder 43 is passed to a transmitter T$x$2 and thence to a transmit-receive switch 44 and so via the aerial relay 41 to the antenna A$e$3.

If the second aircraft is on the bearing of danger, it responds and the response is received by the antenna A$e$3 and passes through the aerial relay 41 and transmit-receive switch 44 to a receiver R$x$3 to reply signal being two pulses. These two pulses are passed from the receiver R$x$3 to a height gate 45 set by the height device 22 so that if the height coding is correct one pulse emerges from the height gate 45. This pulse is then passed to a switch 46 which has been set so that the pulse passes through to a range gate 47. The switch 46 is set by a pulse emitted from the interrogation coder 42 so that only after an interrogation has been carried out does the switch 46 connect the height gate 45 to the range gate 47. The range gate 47 is opened by the interrogation coder and is closed after a time corresponding to the most distant aircraft that is of interest and this closing may be set manually or may be controlled by the estimated closing speed as derived from the computer 27 (see particularly the description of FIGURE 6).

If the pulse passes through the range gate 47 it is passed to the warner 33.

The aerial relay 41 is arranged to relax after the necessary period of time and this relay normally connects an omni-directional antenna A$e$4 to the transmit-receive switch 44. If therefore an interrogation is received by a vessel having the apparatus shown in FIGURE 7 this will normally be received on the antenna A$e$4 and will be passed through the relay 41 to the transmit-receive switch 44 and thence to the receiver R$x$3. This interrogation will be examined to check that it is correctly height coded by the height gate 45 and will then pass to the switch 46. Since it is an interrogation and not a response, the switch 46 will be in the position to pass the interrogation signal to an interrogation code gate 48 to examine whether it is a correctly coded interrogation. If it is a correctly coded interrogation, the interrogation code gate passes the signal to the height coder 43 where the pulse is transformed into two pulses and these two pulses are then passed to the transmitter T$x$2, the transmit-receive switch 44 and then via the aerial relay 41 to the antenna A$e$4.

It may be extremely desirable to add to the system apparatus for determining the range of the intruding aircraft so that it is not necessary to take action to avoid an aircraft which is at a definitely safe distance. It will be remembered that in the preferred arrangement the transmission from one aircraft consists of a train of ten pulses with the last two of these pulses being in the form of the second part of a two-part height coding. In accordance with a particular modification of the invention, the tenth pulse is used to activate a transponder receiver which is allowed to remain active only for the time corresponding to an aircraft at the maximum distance from which a collision is to be expected with a set time. Thus the receiver may remain active either for a sufficient time to allow an aircraft which is approaching head-on at the maximum possible speed to respond, it being clear that this is the most distant aircraft that needs to be considered, or for a period determined by the relative velocity as described.

Therefore, the first aircraft receives the sequence of ten pulses and decodes them and determines by the decoding that there is a possibility of danger and then it points a highly directional transmitting antenna associated with the interrogator of a responder system in the direction of the bearing of danger. Immediately subsequent to the reception of the tenth pulse, or at a known time after this reception as may be decided to be most convenient, the first aircraft transmits a signal from the transponder interrogator over the highly directional array and this signal is received by the responder of the second aircraft upon an omni-directional antenna. The second aircraft then responds in the usual manner, again using an omni-directional antenna, which may of course also be its receiving antenna for the interrogator system or which may be separate, the reply transmission being upon the same frequency or upon a different frequency as is well known. The reply from the second aircraft is received by the first aircraft upon either the same highly directional transmitting antenna that was used for the interrogation or upon an associated antenna and therefore the first aircraft is made aware of the distance between the two aircraft. In addition, of course, by the mere fact that it has received a reply to its interrogation, the first aircraft knows that the second aircraft is in point of fact upon the bearing of danger.

In consequence it will be understood that the first aircraft has received the full set of data, has computed the bearing of danger, has interrogated upon this bearing of danger, has received a response indicating that the second aircraft is upon the bearing of danger and also has deduced from the response the distance between the two aircraft. The first aircraft, therefore, knows whether it must take action. In the second aircraft moreover the fact that it has replied to an interrogation can be used as an indication that there is a severe risk of a collision condition existing, but apart from this the second aircraft cannot take action for it has not yet received the full data concerning the first aircraft. This information is transmitted to it in the next transmission of the first aircraft and the second aircraft can, therefore, take what steps appear necessary at that time.

Theoretical considerations show that it is extremely desirable that avoiding action should only be taken in respect of aircraft which are within a certain distance for any given combination of speeds and that this distance is not the same for all directions relative to the aircraft's course. Thus, in general action should be taken to avoid an intruding aircraft which is further away if the intruding aircraft is in the forward sector. The present invention provides an extremely simple method for providing any shape to the air space which is protected by this invention for it is merely necessary to correlate the distance measured by the lapse between the interrogation and the reception of the response with the angle relative to the aircraft's course of the interrogating antenna.

From theoretical considerations it will become apparent that all computations must be based upon the premise that the vessels continue to move on non-manoeuvring courses once they have exchanged the course data and, therefore, the fact that the second vessel may have an indication given to it to say that it has replied to an interrogation and is, therefore, in a collision situation may be used to ensure that the pilot of this vessel does not initiate any manoeuvre which would have the effect of nullifying the manoeuvre taken by the first vessel. Thus this indication may be used as a signal to the pilot of the fact that he should continue to move on his present course and should not voluntarily initiate a turn or other manoeuvre without computing the result of such manoeuvre.

One of the most important features of this invention resides in the fact that a pulse coding is used of the type in which the pulses are relatively short. Such a pulse coding has many advantages but it has the important disadvantage that a transmission using such coding cannot in practice be used to cause a mechanical apparatus to home the aerial on the transmissions. As will be understood from the previous description the present invention is based upon the concept of computing the bearing of danger from the decoded signal and then turning a sensitive detector to that bearing. Whilst it may appear at first sight that the present invention is merely carrying out the previous suggestions in a slightly different manner and order, in point of fact the present invention offers unsuspected advantages as will now be clear.

I claim:

1. Apparatus for the avoidance of collisions between moving vessels comprising in each vessel means to determine the course and speed of the first vessel; in the second vessel means to transmit the course and speed of such vessel resolved relative to two orthogonal lines; in the first vessel means to receive such transmission from the second vessel; a computer; means to feed to said computer the data received from the second vessel and the data determined in the first vessel and to compute the bearing on which the second vessel must lie to be on a collision course with the first vessel; directional transmitting means; an output from such computer representing such bearing; means turning the said directional transmitting means in accordance with such output; omni-directional receiving means; means to transmit a signal from said directional transmitting means; a responder in said second vessel to receive and reply to said signal; and means in said first vessel to receive such reply.

2. The apparatus of claim 1, wherein are provided means set in accordance with the closing speed of the two vessels as determined by said computor to render insensitive the means in the first vessel to receive such reply after a computed interval.

3. Apparatus for the avoidance of collisions between moving vessels, comprising, in each vessel, means to determine the course and speed of such vessel; in a second vessel, means to transmit data regarding the components of the velocity of the second vessel relative to two orthogonal datum lines; in a first vessel, means to receive such transmission, a computer, means to feed to said computer the data received from the second vessel and the data determined in the first vessel, whereby the computer computes the bearing on which the second vessel must lie to be on a collision course with the first vessel, and means to represent the output of said computer as a bearing.

4. The apparatus of claim 3 including in the second vessel, means to generate a train of pulses coded to indicate said velocity components, and for transmission of the second vessel said coding means comprising a pulse source; an origin delay means; delay means set in accordance with resolved speed in one direction; delay means set in accordance with resolved speed at right angles thereto; and pulse outputs from the pulse source and between the said three delay means which are connected in series, whereby a train of four pulses is generated.

5. The apparatus of claim 4 and for use in aircraft, including a transmitter in the second aircraft wherein means are provided to pass said pulses to said transmitter directly and via delay means set in accordance with the first part of a height code.

6. The apparatus of claim 5, wherein said pulse source is additionally connected to a long standard delay thereby to generate a further pulse at a known time after the first pulse and means are provided to pass said further pulse to said transmitter directly and via delay means set in accordance with a second part of the height code.

7. Apparatus for preventing collisions between two mobile vehicles, comprising, in each vehicle, means to derive signals representing the components of the velocity of such vehicle relative to two orthogonal datum lines; in the second vehicle, means to send a transmission coded with the components of the velocity of the second vehicle relative to said two orthogonal datum lines; in the first vessel, means to receive such transmission, means to derive signals representing these components of the velocity of the second vehicle, a computer responsive to said signals representing the components of the velocity of the first vehicle and to said signals representing the components of the velocity of the second vehicle, whereby said computer produces an output representing the bearing on which the second vehicle must be found if collision between the two vehicles is due, directional antenna means, and means to set such antenna means in accordance with the output of the computer.

8. The apparatus of claim 7, wherein is provided as said computer, a first resolver, means to feed to the winding of such resolver first and second voltages corresponding respectively to the speed of the second vessel resolved relative to said two orthogonal datum lines, means to turn the rotor of such resolver relative to its stator in accordance with the heading of the first vessel, thereby to generate third and fourth voltages corresponding respectively to the speed of the second vessel resolved along and normal to the course of the first vessel, means to add to the third voltage a voltage corresponding to the speed of the first vessel, to produce a fifth voltage, a second resolver, means to apply the fourth and fifth voltages to two of its windings, a motor and means to draw from a rotor winding of the second resolver a voltage which is used to operate the motor to turn such rotor into the null position.

9. Collision warning apparatus for use by two stations, at least one of which is mobile, comprising, in the first station, means for deriving the components of its velocity relative to two orthogonal datum lines and means for transmitting such components of velocity in coded form, and, in the second station, means to receive such transmission, means to derive therefrom signals corresponding to said components of the velocity of the first station, a computer, and means to pass such signals to the computer, means to pass to the computer data regarding the course and speed of the second station, a directional antenna with a null, said directional antenna being rotated by the computer so that said null lies in the direction of the relative velocity of the second station with respect to the first station, an omnidirectional antenna, and means to give warning when the reception of a transmission by said omnidirectional antenna is simultaneously accompanied by absence of reception of a transmission by said directional antenna.

10. Apparatus for the avoidance of collisions between moving vehicles, comprising in a second vessel means to transmit telemetered signals in a first vehicle, means to derive a signal representing the speed of the first vehicle, a first resolver whose rotor is rotated in accordance with the course of the first vehicle, said rotor producing two output signals, where the first output signal represents the speed of the first vehicle resolved along a first horizontal datum line, and the second output signal represents the speed of the first vehicle resolved along a second horizontal datum line orthogonal to said first horizontal datum line, means to receive a first telemetered signal representing the speed of a second vehicle resolved along said first horizontal datum line and means to subtract this signal from the first output signal from the first resolver, thereby to obtain a first difference signal, means to receive a second telemetered signal representing the speed of the second vehicle resolved along said second horizontal datum line and means to subtract this signal from the second output signal from the first resolver, thereby to obtain a second difference signal, a second resolver with two stator windings, means to rotate the stator windings in accordance with the course of the vessel so as to maintain said stator windings in a constant spatial direction, the first stator winding being fed with said first difference signal and the second stator winding being fed with said second difference signal, and means to detect an output signal from the rotor of said second resolver and to turn said rotor of said second resolver to a direction where said output signal from said rotor of said second resolver is substantially zero, and a directionally sensitive device set in accordance with the direction of the rotor of said second resolver.

References Cited in the file of this patent

UNITED STATES PATENTS

| | | |
|---|---|---|
| 2,554,893 | Brunn | May 29, 1951 |
| 2,568,568 | Stansbury | Sept. 18, 1951 |
| 2,933,726 | Campbell et al. | Apr. 19, 1960 |

OTHER REFERENCES

Brantley: "The In-Flight Collision Problem," Aeronautical Engineering Review, vol. 15, No. 7, July 1956, pp. 45–63 (pp. 50–51 relied on).